US006969989B1

(12) United States Patent
Mei

(10) Patent No.: US 6,969,989 B1
(45) Date of Patent: Nov. 29, 2005

(54) METHOD FOR CHARACTERIZING A PERPENDICULAR RECORDING HEAD WRITING POLE

(75) Inventor: Lin Mei, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 11/078,266

(22) Filed: Mar. 11, 2005

(51) Int. Cl.[7] ......................... G11B 5/187; G11B 5/455

(52) U.S. Cl. ...................... 324/210; 360/110; 360/125; 360/31

(58) Field of Search ................................ 324/210–213; 360/110, 122, 125–126, 31

(56) References Cited

U.S. PATENT DOCUMENTS 6,504,675 B1 * 1/2003 Shukh et al. ............... 360/125
6,721,131 B2 * 4/2004 Litvinov et al. ............ 360/125
2003/0193742 A1 * 10/2003 Matono et al. ............. 360/126
2004/0080856 A1 * 4/2004 Tomiyama et al. ........... 360/75

* cited by examiner

*Primary Examiner*—Bot LeDynh
(74) *Attorney, Agent, or Firm*—Joshua C. Harrison, Esq.; Knobbe Martens Olson & Bear

(57) ABSTRACT

A method characterizes a generally-trapezoidally-shaped portion of a writing pole of a perpendicular magnetic write head in proximity to a magnetic medium. The method includes providing measured track width data corresponding to magnetic track widths of a plurality of tracks written by the writing pole on a rotating magnetic medium underlying the writing pole. The magnetic track widths vary as a function of skew angle of the writing pole during writing. The method further includes determining a magnetic width of the wider of a leading edge and a trailing edge of the writing pole from a first portion of the measured track width data corresponding to a first range of skew angles. The method further includes determining at least one magnetic taper angle of the writing pole from the measured track width data.

27 Claims, 7 Drawing Sheets

TW=WWo

TW=WWo·cos (α1)

$TW = WW_o \cdot \cos(-\alpha_2)$ $TW = WW_o \cdot \cos(\alpha_1) + D_p$

METHOD FOR CHARACTERIZING A PERPENDICULAR RECORDING HEAD WRITING POLE

BACKGROUND OF THE INVENTION

1. Field of the Invention

This application relates generally to perpendicular magnetic recording heads, and more particularly to methods and systems for characterizing the geometry of a generally trapezoidal portion of a perpendicular magnetic recording head writing pole.

2. Description of the Related Art

In perpendicular magnetic recording, the magnetic transitions formed in the magnetic medium are written by a writing pole in proximity to the magnetic medium. The widths of the magnetic tracks written by the writing pole depend in part on the geometry of the portion of the writing pole (i.e., the "footprint") in proximity to the magnetic medium. It is therefore useful to characterize the geometry of this portion of the writing pole.

DETAILED DESCRIPTION OF EXEMPLARY EMBODIMENTS

Figure 1A:
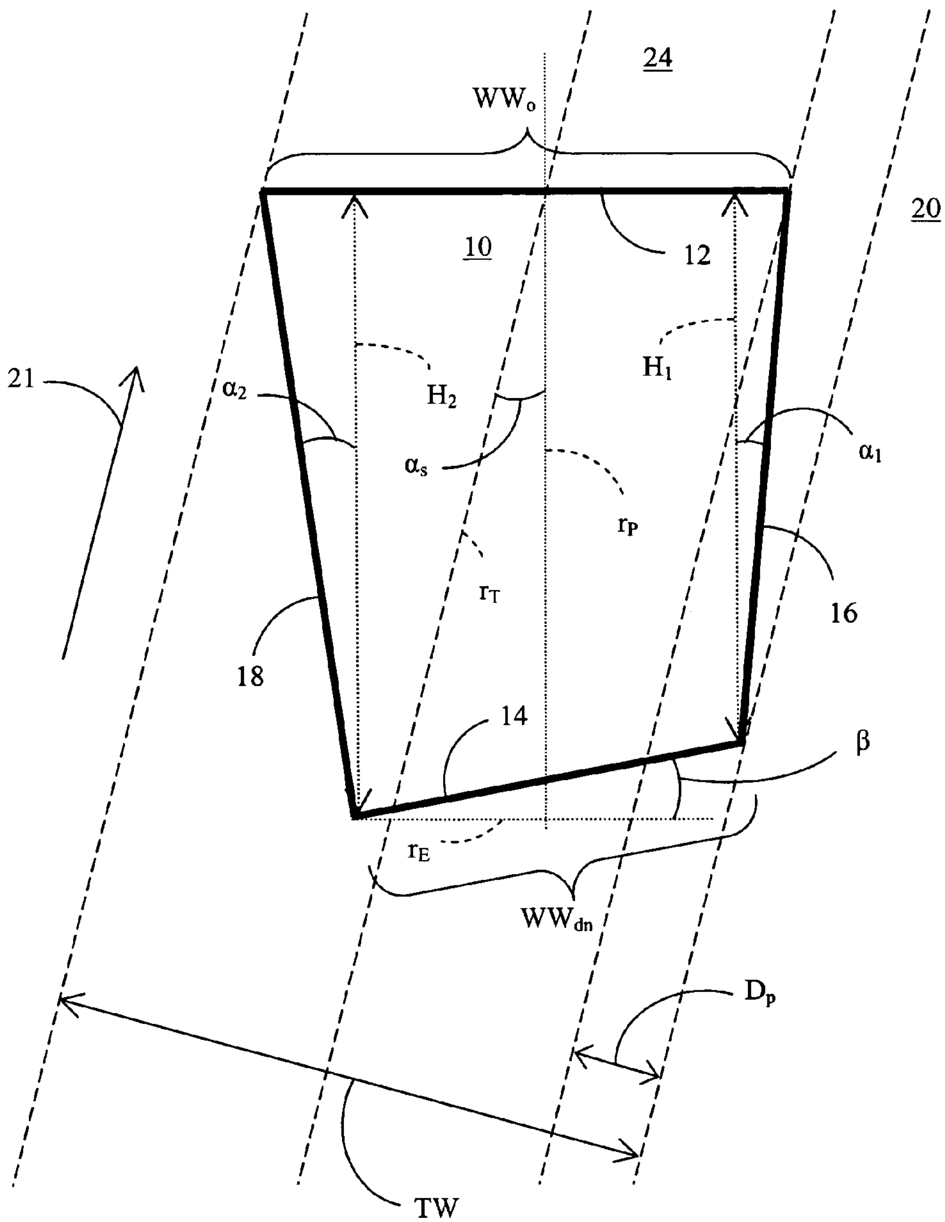
FIG. 1A schematically illustrates the magnetic geometry of a portion of an exemplary writing pole (the "footprint") of a perpendicular magnetic write head in proximity to a magnetic medium in accordance with an embodiment described herein.

FIG. 1A schematically illustrates the magnetic geometry of a portion of an exemplary writing pole 10 (the "footprint") of a perpendicular magnetic write head in proximity to a magnetic medium 20 in accordance with an embodiment described herein. The portion of the writing pole 10 has a generally trapezoidal shape with a trailing edge 12 having a magnetic width $WW_0$ and a leading edge 14 having a magnetic width $WW_{dn}$. The writing pole 10 also has a first side edge 16 and a second side edge 18. The first side edge 16 intersects the trailing edge 12 and the leading edge 14. The second side edge 18 intersects the trailing edge 12 and the leading edge 14.

In certain embodiments, the trailing edge 12, the leading edge 14, the first side edge 16, and the second side edge 18 are defined in view of the relative movement between the writing pole 10 and the magnetic medium 20. For example, as schematically illustrated by FIG. 1A, the magnetic medium 20 is moving in a direction indicated by the arrow 21. The leading edge 14 is generally the first edge of the writing pole 10 which passes over an underlying portion of the magnetic medium 20. The trailing edge 12 is generally the last edge of the writing pole 10 which passes over an underlying portion of the magnetic medium 20. The first side edge 16 and the second side edge 18 are the remaining two sides of the writing pole 10. In certain embodiments, the trailing edge 12 is wider than the leading edge 14, while in other embodiments, the leading edge 14 is wider than the trailing edge 12.

The portion of the writing pole 10 schematically illustrated by FIG. 1A has a first magnetic length $H_1$, a first magnetic taper angle $\alpha_1$, a second magnetic length $H_2$, a second magnetic taper angle $\alpha_2$, and an angle $\beta$ between the trailing edge 12 and the leading edge 14. The first magnetic length $H_1$ is the distance (measured along a line perpendicular to the wider of the trailing edge 12 and the leading edge 14) between the wider of the trailing edge 12 and the leading edge 14 and the intersection of the first side edge 16 and the narrower of the trailing edge 12 and the leading edge 14. In the exemplary embodiment of FIG. 1A, the first magnetic length $H_1$ is the distance (measured along a line perpendicular to the trailing edge 12) between the trailing edge 12 and the intersection of the first side edge 16 and the leading edge 14. The second magnetic length $H_2$ is the distance (measured along a line perpendicular to the wider of the trailing edge 12 and the leading edge 14) between the wider of the trailing edge 12 and the leading edge 14 and the intersection of the second side edge 18 with the narrower of the trailing edge 12 and the leading edge 14. In the exemplary embodiment of FIG. 1A, the second magnetic length $H_2$ is the distance (measured along a line perpendicular to the trailing edge 12) between the trailing edge 12 and the intersection of the second side edge 18 and the leading edge 14. The first magnetic taper angle $\alpha_1$ is the angle between the first side edge 16 of the writing pole 10 and a line perpendicular to the wider of the trailing edge 12 and the leading edge 14. The second magnetic taper angle $\alpha_2$ is the angle between the second side edge 18 of the writing pole 10 and a line perpendicular to the wider of the trailing edge 12 and the leading edge 14. In the exemplary embodiment of FIG. 1A, the first magnetic taper angle $\alpha_1$ is the angle between the first side edge 16 and a line perpendicular to the trailing edge 12, and the second magnetic taper angle $\alpha_2$ is the angle between the second side edge 18 and a line perpendicular to the trailing edge 12. The angle $\beta$ between the trailing edge 12 and the leading edge 14 is shown in FIG. 1A as the angle between the leading edge 14 and a reference line $r_E$ parallel to the trailing edge 12. In certain embodiments, these magnetic dimensions generally track the physical dimensions of the writing pole 10 but are larger than the physical dimensions due to splaying of the magnetic fields between the writing pole 10 and the magnetic medium 20.

In certain embodiments, the first magnetic taper angle $\alpha_1$ is in a range between approximately 3 degrees and approximately 10 degrees, while in other embodiments, the first magnetic taper angle $\alpha_1$ is in a range between approximately 5 degrees and approximately 10 degrees. In certain embodiments, the second magnetic taper angle $\alpha_2$ is in a range between approximately 3 degrees and approximately 10 degrees, while in other embodiments, the second magnetic taper angle $\alpha_2$ is in a range between approximately 5 degrees and approximately 10 degrees. In certain embodiments, the angle β between the trailing edge 12 and the leading edge 14 is in a range between approximately 3 degrees and approximately 10 degrees. In certain embodiments, the width $WW_o$ of the trailing edge 12 is in a range between approximately 5 microinches and approximately 15 microinches, while in other certain embodiments, the width $WW_o$ of the trailing edge 12 is approximately 11 microinches. In certain embodiments, the width $WW_{dn}$ of the leading edge 14 is in a range between approximately 5 microinches and approximately 15 microinches, while in other certain embodiments, the width $WW_{dn}$ of the leading edge 14 is approximately 11 microinches. In certain embodiments, the first magnetic length $H_1$ is in a range between approximately 5 microinches and approximately 20 microinches, while in other certain embodiments, the first magnetic length $H_1$ is approximately 15 microinches. In certain embodiments, the second magnetic length $H_2$ is in a range between approximately 5 microinches and approximately 20 microinches, while in certain other embodiments, the second magnetic length $H_2$ is approximately 15 microinches.

Figure 1B:
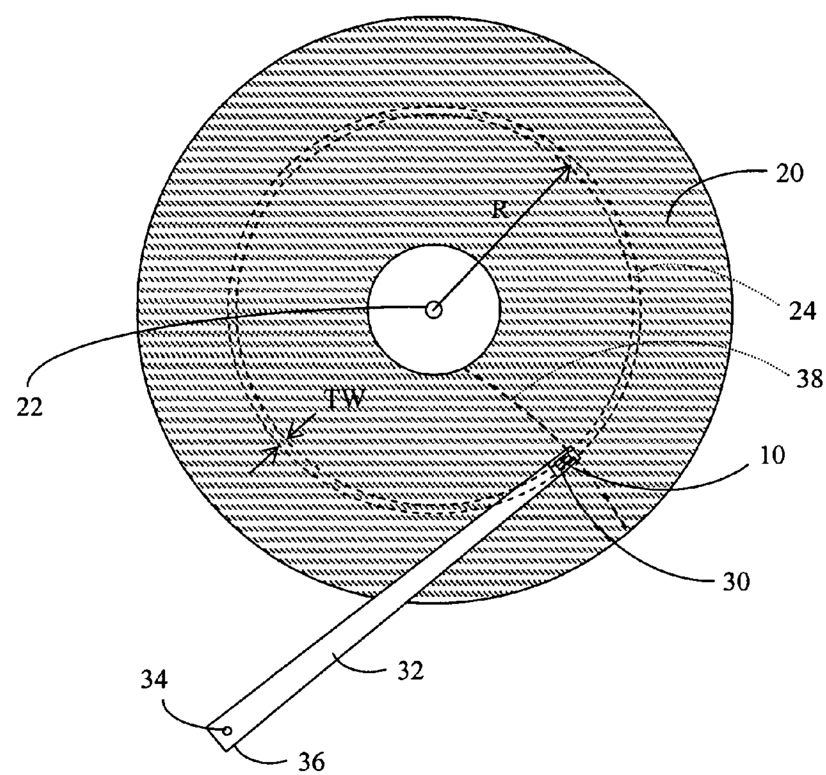
FIG. 1B schematically illustrates the writing pole above a rotating magnetic medium of a dynamical electrical tester in accordance with certain embodiments described herein.

FIG. 1B schematically illustrates the writing pole 10 above a rotating magnetic medium 20 of a dynamical electrical tester in accordance with certain embodiments described herein. In certain embodiments, the writing pole 10 is part of a perpendicular write head 30 proximate to one end of a drive arm 32 which can be rotated about an axis 34 proximate to an opposite end 36 of the drive arm 32. As the magnetic medium 20 rotates about its axis of rotation 22, the writing pole 10 writes data onto the magnetic medium 20 in the form of regions with alternating directions of magnetization along arcs of generally circular tracks 24. The tracks 24 have a magnetic track width TW and are positioned at various radial distances R from the axis of rotation 22. As used herein, the term "track width" refers to the width of the track 24 along a line substantially perpendicular to the track 24. The write head 30 accesses the different tracks 24 at different radial distances R by rotating the drive arm 32 about its axis 34 so that the writing pole 10 is positioned at different positions along the path 38.

In certain embodiments, a skew angle $\alpha_s$ is defined to be the angle between the writing pole 10 and the track 24. As used herein, the skew angle $\alpha_s$ is defined as the angle between a line generally parallel to the track 24 and a line generally perpendicular to the wider of the trailing edge 12 and the leading edge 14. As schematically illustrated by FIG. 1A, the skew angle $\alpha_s$ is shown between a reference line $r_T$ generally parallel to the track 24 and a reference line $r_p$ generally perpendicular to the trailing edge 12, which is wider than the leading edge 14. As illustrated by FIG. 1B, the skew angle $\alpha_s$ is dependent on the radial distance R of the writing pole 10 from the axis of rotation 22 because as the drive arm 32 is rotated about its axis 36, the skew angle $\alpha_s$ changes due to the changing orientation between the writing pole 10 and the track 24 being written. In certain embodiments, the dynamical electrical tester is configured to controllably adjust the skew angle $\alpha_s$ during the writing process. In certain such embodiments, the writing pole 10 is maintained at a substantially constant radial distance R while the skew angle $\alpha_s$ is adjusted by rotating the writing pole 10 relative to the drive arm 32 about an axis generally perpendicular to the magnetic medium 20. Such embodiments advantageously adjust the skew angle $\alpha_s$ substantially independently of the radial distance R of the writing pole 10 from the axis of rotation 22.

Such dynamical electrical testing systems, sometimes referred to as "read write analyzers," are component-level testing systems generally used in the performance analysis of magnetic write heads. The dynamical electrical testing system exercises the read and write performance of the write head and the magnetic media to perform various parametric tests, e.g., amplitude, asymmetry, reader and writer widths, signal-to-noise ratios, bit error rates, resolutions, and pulse width (e.g., PW50). Exemplary dynamical electrical testing systems that may be used with embodiments described herein include, but are not limited to, the Guzik Spinstand V2002 and the Guzik Spinstand S-1701B, both of which are available from Guzik Technical Enterprises of Mountain View, Calif.

In certain embodiments, the skew angle $\alpha_s$ is typically in a range between approximately +15 degrees and approximately −15 degrees. As used herein, positive values of the skew angle $\alpha_s$ refer to orientations in which the writing pole 10 is rotated counterclockwise with respect to the track 24 (e.g., FIG. 1A schematically illustrates an orientation with a large positive skew angle). Negative values of the skew angle $\alpha_s$ refer to orientations in which the writing pole 10 is rotated clockwise with respect to the track 24. The condition of the skew angle $\alpha_s$ equal to zero corresponds to the wider of the trailing edge 12 and the leading edge 14 being substantially perpendicular to the track 24.

Figure 2A:
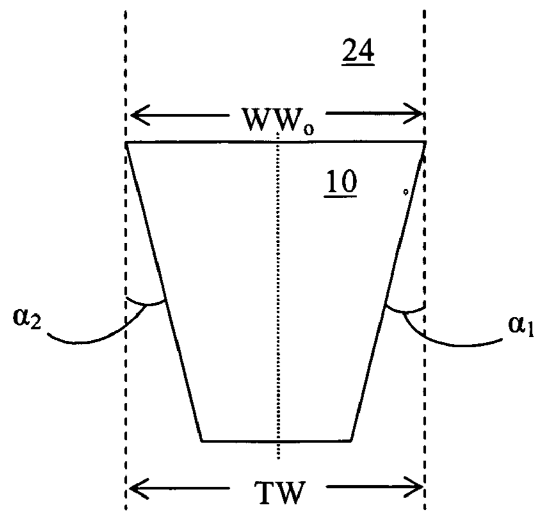
FIG. 2A schematically illustrates the magnetic track width TW of a track written at zero skew angle between the writing pole and the underlying track.

The magnetic track width TW of the track 24 written by the writing pole 10 is determined in part by the magnetic geometry of the writing pole 10. Within a range of skew angles, the narrower of the trailing edge 12 and the leading edge 14 does not extend past the wider of the trailing edge 12 and the leading edge 14, such that the magnetic track width TW of a track 24 written at a skew angle $\alpha_s$ is substantially defined by the magnetic width of the wider of the trailing edge 12 (i.e., $WW_o$) and the leading edge 14 (i.e., $WW_{dn}$). For example, the writing pole 10 schematically illustrated by FIG. 2A is oriented at a skew angle $\alpha_s=0$ relative to the track 24 and the trailing edge 12 is substantially perpendicular to the track 24. Thus, the magnetic track width TW of the track 24 written at zero skew angle is substantially equal to the magnetic width $WW_o$ of the trailing edge 12 (which is larger than the magnetic width $WW_{dn}$ of the leading edge 14).

Figure 2B:
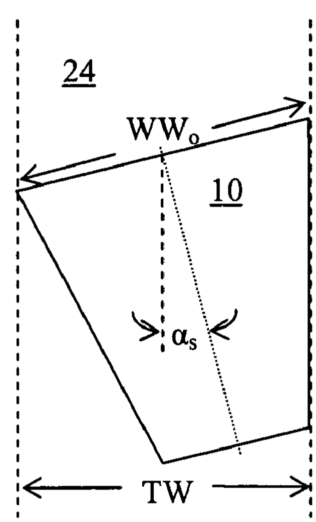
FIG. 2B schematically illustrates the magnetic track width TW of a track written at a skew angle $\alpha_s=\alpha_1$.
Figure 2C:
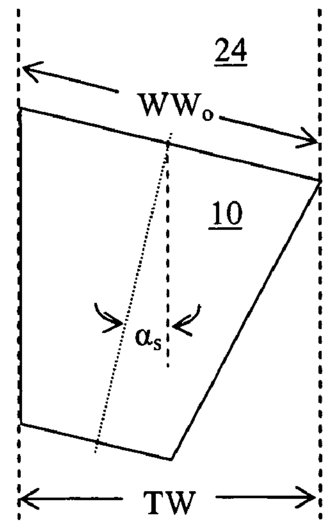
FIG. 2C schematically illustrates the magnetic track width TW of a track written at a skew angle $\alpha_s=-\alpha_2$.

More generally, in certain embodiments with a skew angle for which the narrower of the trailing edge 12 and the leading edge 14 does not extend past the wider of the trailing edge 12 and the leading edge 14, the magnetic track width TW is generally equal to a projection of the larger of the magnetic width of the trailing edge 12 and the leading edge 14 along a line substantially perpendicular to the track 24. For example, FIG. 2B schematically illustrates the magnetic track width TW for the condition when the writing pole 10 of FIG. 2A is rotated counterclockwise relative to the track 24 with a skew angle $\alpha_s$ having a magnitude equal to the first magnetic taper angle $\alpha_1$. The magnetic track width TW of FIG. 2B is substantially equal to the cosine of the skew angle $\alpha_s$ multiplied by the larger of the magnetic width of the trailing edge 12 (i.e., $WW_o$) and the leading edge 14 (i.e., $WW_{dn}$). The magnetic track width TW of FIG. 2B is thus substantially equal to the magnetic width $WW_o$ of the trailing edge 12 (which is larger than the magnetic width $WW_{dn}$ of the leading edge 14) multiplied by the cosine of the skew angle $\alpha_s=\alpha_1$. As a further example, FIG. 2C schematically illustrates the magnetic track width TW for the condition when the writing pole 10 of FIG. 2A is rotated clockwise relative to the track 24 with a skew angle $\alpha_s$ having a magnitude equal to the second magnetic taper angle $\alpha_2$. The magnetic track width TW of FIG. 2C is substantially equal to the magnetic width $WW_o$ of the trailing edge 12 (which is larger than the magnetic width $WW_{dn}$ of the leading edge 14) multiplied by the cosine of the skew angle $\alpha_s=-\alpha_2$.

Figure 2D:
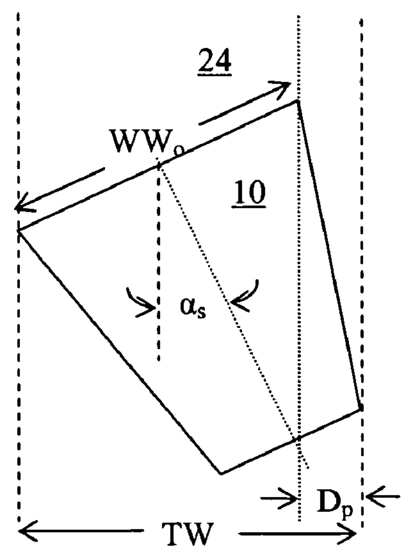
FIG. 2D schematically illustrates the magnetic track width TW of a track written at a skew angle more positive than $+\alpha_1$.

In certain embodiments, the range of skew angles for which the narrower of the trailing edge 12 and the leading edge 14 does not extend past the wider of the trailing edge 12 and the leading edge 14 is generally determined by the magnetic geometry of the writing pole 10, and is generally between approximately $+\alpha_1$ and $-\alpha_2$. In certain embodiments with skew angles outside this range (e.g., more positive than $+\alpha_1$ or more negative than $-\alpha_2$), the narrower of the trailing edge 12 and the leading edge 14 extends past the wider of the trailing edge 12 and the leading edge 14. For such skew angles, the magnetic track width TW is substantially defined by other magnetic parameters of the writing pole 10 besides either the trailing edge 12 or the leading edge 14. For example, as schematically illustrated by FIG. 2D, for the writing pole 10 of FIG. 2A at a skew angle more positive than $+\alpha_1$, the leading edge 14 (which is narrower than the trailing edge 12) extends past the trailing edge 12 by an amount $D_p$, thereby increasing the magnetic track width TW by a corresponding amount. In certain embodiments, this increase of the magnetic track width TW causes unwanted overwriting of adjacent tracks 24. The amount $D_p$ is sometimes termed the "erase width" because it can be the source of undesired overwriting of adjacent tracks 24. The magnetic track width which includes the amount $D_p$ is sometimes termed the "total track width."

In certain embodiments in which the magnetic width $WW_0$ of the trailing edge 12 is wider than the magnetic width $WW_{dn}$ of the leading edge 14 and with skew angles more positive than $+\alpha_1$, the amount $D_p$ by which the leading edge 14 extends past the trailing edge 12 is substantially equal to $$D_p = \frac{H}{\cos(\alpha_1)}\sin(\alpha_s - \alpha_1),$$

and the magnetic track width TW of a track 24 written at a skew angle $\alpha_s$ is substantially equal to $$TW = WW_0\cos(\alpha_s) + \frac{H_1}{\cos(\alpha_1)}\sin(\alpha_s - \alpha_1),$$

where $WW_0$ is the magnetic width of the trailing edge 12 (which equals the magnetic track width of a track 24 written at zero skew angle) and $H_1$ is the first magnetic length. In certain embodiments with skew angles more negative than $-\alpha_2$, the amount $D_p$ by which the leading edge 14 extends past the trailing edge 12 is substantially equal to $$D_p = \frac{H_2}{\cos(\alpha_2)}\sin(-\alpha_s - \alpha_2),$$

and the magnetic track width TW of a track 24 written at a skew angle $\alpha_s$ is substantially equal to $$TW = WW_0\cos(\alpha_s) + \frac{H_2}{\cos(\alpha_2)}\sin(-\alpha_s - \alpha_2),$$

where $WW_0$ is the magnetic width of the trailing edge 12 (which equals the magnetic track width of a track 24 written at zero skew angle) and $H_2$ is the second magnetic length. In other embodiments in which the magnetic width $WW_{dn}$ of the leading edge 14 is larger than the magnetic width $WW_0$ of the trailing edge 12, a separate set of later-described equations, similar to the ones discussed above, are used.

Figure 3:
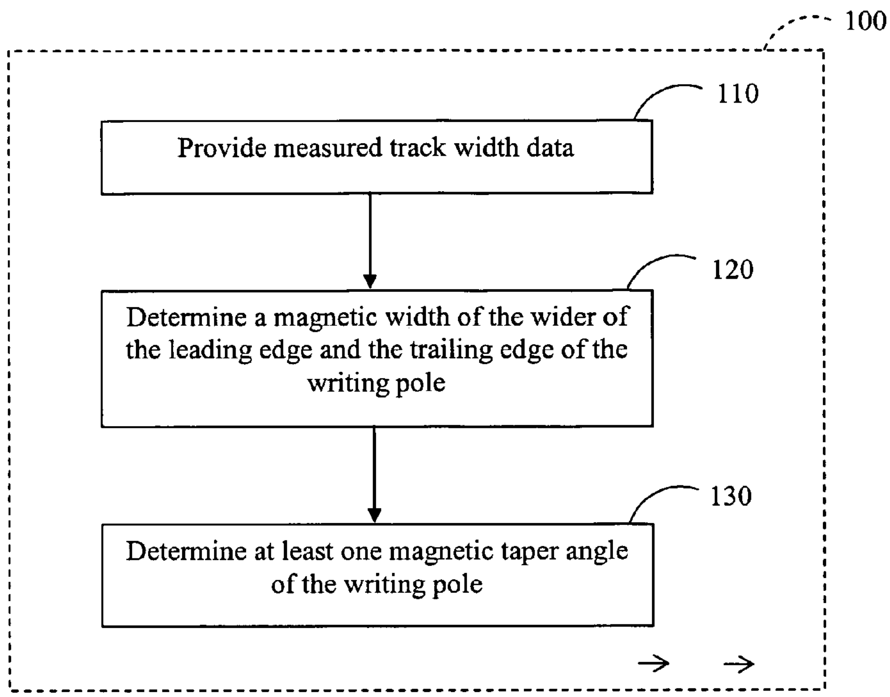
FIG. 3 is a flow diagram of an exemplary method for characterizing a portion of the writing pole of a perpendicular magnetic write head in proximity to a magnetic medium.

FIG. 3 is a flow diagram of an exemplary method 100 for characterizing a portion of the writing pole 10 of a perpendicular magnetic write head in proximity to a magnetic medium 20. As schematically illustrated by FIG. 1A, in certain embodiments, the portion of the writing pole 10 has a generally trapezoidal shape with a trailing edge 12 and a leading edge 14. The method 100 comprises providing measured track width data in an operational block 110. The measured track width data corresponds to magnetic track widths of a plurality of tracks 24 written by the writing pole 10 on a rotating magnetic medium 20 underlying the writing pole 10 during writing. The magnetic track widths vary as a function of skew angle of the writing pole 10 during writing. The method 100 further comprises determining a magnetic width of the wider of the trailing edge 12 and the leading edge 14 of the writing pole 10 from a first portion of the measured track width data in an operational block 120. The first portion of the measured track width data corresponds to a first range of skew angles $\alpha_s$. The method 100 further comprises determining at least one magnetic taper angle of the writing pole 10 from the measured track width data in an operational block 130.

In certain embodiments, the measured track width data are provided in the operational block 110 by a dynamical electrical testing system, as described above and schematically illustrated by FIG. 1B. The tracks 24 of certain embodiments are written by the writing pole 10, and the skew angle $\alpha_s$ is controllably varied or scanned to provide tracks 24 written at various values of the skew angle $\alpha_s$. In certain embodiments, the skew angle $\alpha_s$ is varied with the trailing edge 12 remaining generally centered on the track 24, while in other embodiments, the skew angle $\alpha_s$ is varied with the leading edge 14 remaining generally centered on the track 24.

In certain embodiments, the tracks 24 are written by the writing pole 10 which is positioned at an approximately constant radial distance R from an axis of rotation 22 of the rotating magnetic medium 20. In certain such embodiments, the skew angle $\alpha_s$ is controllably varied or scanned during writing, and the drive arm 32 is maintained at an approximately constant radial position R from the axis of rotation 22 of the rotating magnetic medium 20. Certain such embodiments advantageously avoid the dependence of the skew angle $\alpha_s$ on the radial distance R.

In certain embodiments, the tracks 24 are written by the writing pole 10 which is positioned at an approximately constant height above the rotating magnetic medium 20. In certain such embodiments, the approximately constant height is maintained by an air bearing between the writing pole 10 and the rotating magnetic medium 20. In other such embodiments, the approximately constant height is maintained by adjusting a rotation speed of the rotating magnetic medium 20. By maintaining a substantially constant height of the writing pole 10 above the rotating magnetic medium 20, certain embodiments advantageously avoid variations of the magnetic track widths written the writing pole 10 due to changes of the splaying of the magnetic fields caused by changes of the height of the writing pole 10.

In still other embodiments, the tracks 24 are written by the writing pole 10 positioned at a height above the rotating magnetic medium 20, with the height having a predetermined dependence on the skew angle $\alpha_s$. In addition, the magnetic track widths written by the writing pole 10 of certain embodiments have a predetermined dependence on the height of the writing pole 10 during writing. In certain such embodiments, the method 100 further comprises compensating for variations of the height of the writing pole 10 above the rotating magnetic medium 20 using the predetermined dependence of the height on the skew angle $\alpha_s$ and using the predetermined dependence of the magnetic track widths on the height.

In certain embodiments, the tracks 24 are written by the writing pole 10 at a write frequency of approximately 100 Megahertz. In other embodiments, the tracks 24 are written by the writing pole 10 at a write frequency in a range between approximately 10 Megahertz and approximately 5 Gigahertz. Other write frequencies are also compatible with embodiments described herein.

Figure 4:
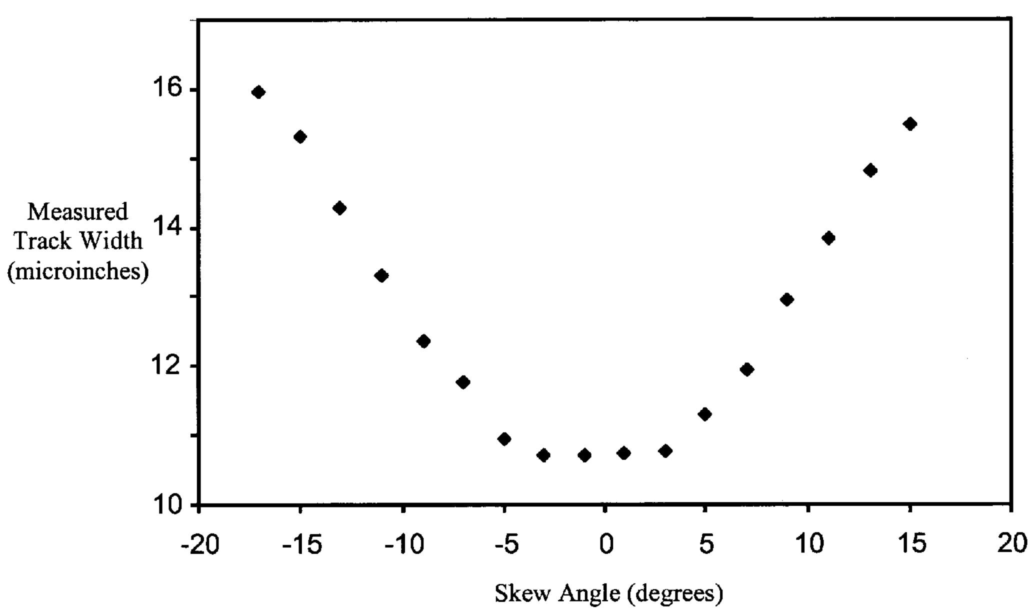
FIG. 4 is a plot of an exemplary set of measured track width data for a writing pole having a trailing edge wider than the leading edge.

FIG. 4 is a plot of an exemplary set of measured track width data for a writing pole 10 having a trailing edge 12 wider than the leading edge 14. Such measured track width data is obtainable using a dynamical electrical tester in accordance with embodiments described herein. The measured track width data correspond generally to a range of skew angles $\alpha_s$ between approximately −17 degrees and approximately +15 degrees. For this range of skew angles $\alpha_s$, the measured track width data is in a range between approximately 10 microinches and approximately 16 microinches. Other sets of measured track width data corresponding to other ranges and other values of skew angles $\alpha_s$ are compatible with embodiments described herein.

In certain embodiments, the magnetic width of the wider of the trailing edge 12 and the leading edge 14 is determined in the operational block 120 from a portion of the measured track width data corresponding to a first range of skew angles $\alpha_s$ which comprises skew angles with magnitudes smaller than a magnetic taper angle of the writing pole 10. For example, for a writing pole 10 having at least one magnetic taper angle of approximately 3 degrees, the first range of skew angles $\alpha_s$ comprises skew angles with magnitudes smaller than approximately 3 degrees. The first range of skew angles $\alpha_s$ of certain embodiments includes a skew angle $\alpha_s$ of zero. In other embodiments, the first range of skew angles $\alpha_s$ includes positive skew angles, negative skew angles, or both positive and negative skew angles. For example, as illustrated by the writing pole 10 of FIG. 1A and the measured track width data of FIG. 4, in certain embodiments, the magnetic width $WW_o$ of the trailing edge 12 is determined in the operational block 120 using the portion of the measured track width data corresponding to a range of skew angles $\alpha_s$ between approximately ±3 degrees.

In certain embodiments, the writing pole 10 has a trailing edge 12 wider than the leading edge 14, and the magnetic width $WW_o$ of the trailing edge 12 is determined in the operational block 120 by fitting a first portion of the measured track width data (e.g., a portion corresponding to a range of skew angles $\alpha_s$ between approximately ±3 degrees) to a fitting function $TW=WW_o\cos(\alpha_s)$, where TW is the measured track width of a track 24 written at a skew angle $\alpha_s$, and $WW_o$ is the magnetic width of the trailing edge 12. In certain other embodiments in which the writing pole 10 has a leading edge 14 wider than the trailing edge 12, the magnetic width $WW_{dn}$ of the leading edge 14 is determined from corresponding measured track width data by fitting a first portion of the measured track width data to a fitting function $TW=WW_{dn}\cos(\alpha_s)$, where TW is the measured track width of a track 24 written at a skew angle $\alpha_s$, and $WW_{dn}$ is the magnetic width of the leading edge 14.

In certain other embodiments, determining the magnetic width of the wider of the trailing edge 12 and the leading edge 14 in the operational block 120 comprises calculating an average magnetic track width of the first portion of the measured track width data. For example, for a writing pole 10 having a trailing edge 12 wider than the leading edge 14, the calculated average magnetic track width for the first portion (e.g., for skew angles $\alpha_s$ between approximately ±3 degrees) is equated to the magnetic width $WW_o$ of the trailing edge 12. Such embodiments utilize the small-angle approximation in which the cosine of small skew angles (e.g., between approximately ±3 degrees) is approximately equal to one. Similarly, for a writing pole 10 having a leading edge 14 wider than a trailing edge 12, the calculated average magnetic track width for the first portion is equated to the magnetic width $WW_{dn}$ of the leading edge 14.

Figure 5:
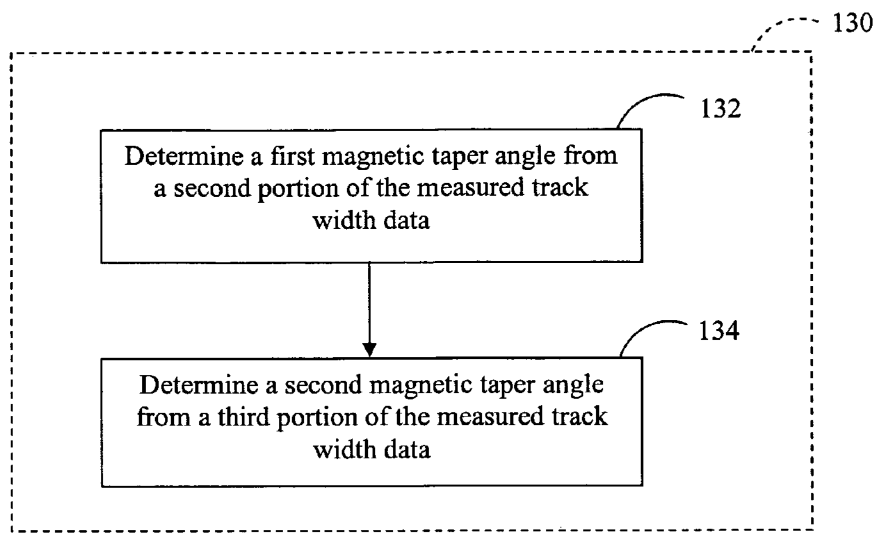
FIG. 5 is a flow diagram for determining at least one magnetic taper angle of the writing pole from the measured track width data in accordance with certain embodiments described herein.

FIG. 5 is a flow diagram of the operational block 130 for determining at least one magnetic taper angle of the writing pole 10 from the measured track width data in accordance with certain embodiments described herein. In an operational block 132, a first magnetic taper angle $\alpha_s$ of the writing pole 10 is determined from a second portion of the measured track width data. The second portion of the measured track width data comprises positive skew angles $\alpha_s$ having magnitudes larger than the first magnetic taper angle $\alpha_1$. For example, as illustrated by the measured track width data of FIG. 4, in certain embodiments, the positive skew angles $\alpha_s$ of the second portion include skew angles $\alpha_s$ more positive than approximately +3 degrees. In an operational block 134, a second magnetic taper angle $\alpha_2$ of the writing pole 10 is determined from a third portion of the measured track width data. The third portion of the measured track width data comprises negative skew angles $\alpha_s$ having magnitudes larger than the second magnetic taper angle $\alpha_2$. For example, as illustrated by the measured track width data of FIG. 4, in certain embodiments, the negative skew angles $\alpha_s$ of the third portion include skew angles $\alpha_s$ more negative than approximately −3 degrees.

In certain embodiments, determining the first magnetic taper angle $\alpha_1$ in the operational block 132 comprises fitting the second portion of the measured track width data to a fitting function $$TW = WW_0\cos\alpha_s + \left(\frac{H_1}{\cos\alpha_1}\right)\sin(\alpha_s - \alpha_1),$$

where TW is the measured track width of a track 24 written at a skew angle $\alpha_s$, $WW_o$ is the magnetic width of the trailing edge 12, $H_1$ is the first magnetic length, and $\alpha_1$ is the first magnetic taper angle. Similarly, for embodiments in which the leading edge 14 is wider than the trailing edge 12, the second magnetic taper angle $\alpha_2$ is determined by a similar fitting function $$TW = WW_{dn}\cos\alpha_s + \left(\frac{H_2}{\cos\alpha_2}\right)\sin(\alpha_s - \alpha_2).$$

The first magnetic length $H_1$ is also determined from the fitting function in certain embodiments. For example, in embodiments in which the trailing edge 12 is wider than the leading edge 14, an average first magnetic length of the fitting function is calculated for the positive skew angles of the second portion, and equated to the first magnetic length $H_1$. Similarly, in embodiments in which the leading edge 14 is wider than the trailing edge 12, an average second magnetic length of the fitting function is calculated for positive skew angles of the second portion, and equated to the second magnetic length $H_2$.

In certain other embodiments in which the trailing edge 12 is wider than the leading edge 14, determining the first magnetic taper angle $\alpha_1$ in the operational block 132 comprises fitting the second portion of the measured track width data to a linear function $TW=WW_o+H_1(\alpha_s-\alpha_1)$, where TW is the measured track width of a track 24 written at a skew angle $\alpha_s$, $WW_0$ is the magnetic width of the trailing edge 12, $H_1$ is the first magnetic length, and $\alpha_1$ is the first magnetic taper angle. Such embodiments utilize the small-angle approximation in which the cosine of the skew angle $\alpha_s$ is approximately equal to one, the cosine of the first magnetic taper angle $\alpha_1$ is approximately equal to one, and the sine of the difference $(\alpha_s-\alpha_1)$ is approximately equal to $(\alpha_s-\alpha_2)$. Similarly, for certain embodiments in which the leading edge 14 is wider than the trailing edge 12, the first magnetic taper angle $\alpha_1$ is determined by a similar linear function $TW=WW_{dn}+H_2\ (\alpha_s-\alpha_2)$.

The first magnetic length $H_1$ is also determined from the linear function in certain embodiments. For example, in certain embodiments in which the trailing edge 12 is wider than the leading edge 14, the slope of the linear function is calculated for the positive skew angles of the second portion, and equated to the first magnetic length $H_1$. Similarly, in certain other embodiments in which the leading edge 14 is wider than the trailing edge 12, the slope of the linear function is calculated for the positive skew angles of the second portion, and equated to the second magnetic length $H_2$.

In certain embodiments in which the trailing edge 12 is wider than the leading edge 14, determining the second magnetic taper angle $\alpha_2$ in the operational block 134 comprises fitting the third portion of the measured track width data to a fitting function $$TW = WW_o\cos\alpha_s + \left(\frac{H_2}{\cos\alpha_2}\right)\sin(-\alpha_s - \alpha_2),$$

where TW is the measured track width of a track 24 written at a skew angle $\alpha_s$, $WW_o$ is the magnetic width of the trailing edge 12, $H_2$ is the second magnetic length, and $\alpha_2$ is the second magnetic taper angle. Similarly, for certain embodiments in which the leading edge 14 is wider than the trailing edge 12, the first magnetic taper angle $\alpha_1$ is determined by a similar fitting function $$TW = WW_{dn}\cos(-\alpha_s) + \left(\frac{H_1}{\cos\alpha_1}\right)\sin(-\alpha_s - \alpha_1).$$

The second magnetic length $H_2$ is also determined from the fitting function in certain embodiments in which the trailing edge 12 is wider than the leading edge 14. For example, in certain such embodiments, an average second magnetic length of the fitting function is calculated for the negative skew angles of the third portion, and equated to the second magnetic length $H_2$. Similarly, in certain embodiments in which the leading edge 14 is wider than the trailing edge 12, an average first magnetic length of the fitting function is calculated for negative skew angles of the third portion, and equated to the first magnetic length $H_1$.

In certain other embodiments in which the trailing edge 12 is wider than the leading edge 14, determining the second magnetic taper angle $\alpha_2$ in the operational block 134 comprises fitting the third portion of the measured track width data to a linear function $TW=WW_o+H_2\ (\alpha\alpha_s-\alpha_2)$, where TW is the measured track width of a track 24 written at a skew angle $\alpha_s$, $WW_o$ is the magnetic width of the trailing edge 12, $H_2$ is the second magnetic length, and $\alpha_2$ is the second magnetic taper angle. Such embodiments utilize the small-angle approximation in which the cosine of the skew angle $\alpha_s$ is approximately equal to one, the cosine of the second magnetic taper angle $\alpha_2$ is approximately equal to one, and the sine of the difference $(-\alpha_s-\alpha_2)$ is approximately equal to $(-\alpha_s-\alpha_2)$. Similarly, for certain embodiments in which the leading edge 14 is wider than the trailing edge 12, the first magnetic taper angle $\alpha_1$ is determined by a similar linear function $TW=WW_{dn}H_1\ (-\alpha_s-\alpha_1)$.

The second magnetic length $H_2$ is also determined from the linear function in certain embodiments in which the trailing edge 12 is wider than the leading edge 14. For example, the slope of the linear function is calculated for the negative skew angles of the third portion, and equated to the second magnetic length $H_2$. In other embodiments in which the leading edge 14 is wider than the trailing edge 12, the slope of the linear function is calculated for the negative skew angles of the third portion, and equated to the first magnetic length $H_1$.

In certain embodiments, the method 100 further comprises calculating the magnetic width of the narrower of the trailing edge 12 and the leading edge 14. In certain embodiments, the method 100 further comprises calculating an angle between the trailing edge 12 and the leading edge 14. These parameters are derivable from the previously-determined values for the magnetic width of the wider of the trailing edge 12 and the leading edge 14, the first magnetic taper angle $\alpha_1$, the first magnetic length $H_1$, the second magnetic taper angle $\alpha_2$, and the second magnetic length $H_2$.

Certain embodiments described herein are useful in computer-implemented analysis of a writing pole 10 of a perpendicular magnetic write head. The general purpose computers used for this purpose can take a wide variety of forms, including network servers, workstations, personal computers, mainframe computers and the like. The code which configures the computer to perform the analysis is typically provided to the user on a computer-readable medium, such as a CD-ROM. The code may also be downloaded by a user from a network server which is part of a local-area network (LAN) or a wide-area network (WAN), such as the Internet.

The general-purpose computer running the software will typically include one or more input devices, such as a mouse, trackball, touchpad, and/or keyboard, a display, and computer-readable memory media, such as random-access memory (RAM) integrated circuits and a hard-disk drive. It will be appreciated that one or more portions, or all of the code may be remote from the user and, for example, resident on a network resource, such as a LAN server, Internet server, network storage device, etc. In certain embodiments, the software controls the dynamic electrical tester which provides the measured track width data. In certain other embodiments, the software receives previously-obtained measured track width data and controls the computer to analyze the data.

Certain embodiments described herein advantageously provide a method of characterizing the writing pole 10 at the component level, before it is incorporated in a write head. Therefore, if the writing pole 10 is found to be faulty (e.g., outside the tolerance levels set for one or more of the magnetic geometry parameters of the writing pole 10), it can be discarded before being integrated into a write head. Certain other embodiments described herein advantageously provide a non-destructive method of characterizing the writing pole 10. Certain previously-used methods (e.g., scanning electron microscopy) require that the writing pole 10 be cut or sectioned to characterize its geometry, making the writing pole 10 being examined unusable as a write head component. Certain other embodiments described herein advantageously provide a simplified and easier-to-use method to characterize the writing pole 10, as compared to certain previously-used methods. For example, optics-based methods do not have sufficient magnification or resolution to provide the accuracy provided by certain embodiments described herein.

What is claimed is:

1. A method for characterizing a portion of a writing pole of a perpendicular magnetic write head in proximity to a magnetic medium, the portion of the writing pole having a generally trapezoidal shape with a leading edge, a trailing edge, a first side edge which intersects the leading edge and the trailing edge, and a second side edge which intersects the leading edge and the trailing edge, the method comprising:

providing measured track width data corresponding to magnetic track widths of a plurality of tracks written by the writing pole on a rotating magnetic medium underlying the writing pole, the magnetic track widths varying as a function of skew angle of the writing pole during writing;

determining a magnetic width of the wider of the leading edge and the trailing edge of the writing pole from a first portion of the measured track width data, the first portion corresponding to a first range of skew angles; and determining at least one magnetic taper angle of the writing pole from the measured track width data.

2. The method of claim 1, wherein the tracks are written by the writing pole positioned at an approximately constant radial distance from an axis of rotation of the rotating magnetic medium.

3. The method of claim 1, wherein the tracks are written by the writing pole positioned at an approximately constant height above the rotating magnetic medium.

4. The method of claim 3, wherein the approximately constant height is maintained by an air bearing between the writing pole and the rotating magnetic medium.

5. The method of claim 3, wherein the approximately constant height is maintained by adjusting a rotation speed of the rotating magnetic medium.

6. The method of claim 1, wherein the tracks are written by the writing pole positioned at a height above the rotating magnetic medium, the height having a predetermined dependence on skew angle, the magnetic track widths written by the writing pole having a predetermined dependence on the height of the writing pole during writing, and wherein the method further comprises compensating for variations of the height of the writing pole above the rotating magnetic medium using the predetermined dependence of the height on skew angle and using the predetermined dependence of the magnetic track widths on the height.

7. The method of claim 1, wherein the tracks are written by the writing pole at a write frequency of approximately 100 Megahertz.

8. The method of claim 1, wherein the tracks are written by the writing pole at a write frequency in a range between approximately 10 Megahertz and approximately 5 Gigahertz.

9. The method of claim 1, wherein the first range of skew angles comprises skew angles with magnitudes smaller than a magnetic taper angle of the writing pole.

10. The method of claim 1, wherein determining the magnetic width of the wider of the leading edge and the trailing edge comprises fitting the first portion of the measured track width data to a fitting function TW=W $\cos(\alpha_s)$, where TW is the measured track width of a track written at a skew angle $\alpha_s$, and W is the magnetic width of the wider of the leading edge and the trailing edge.

11. The method of claim 1, wherein determining the magnetic width of the wider of the leading edge and the trailing edge comprises calculating an average magnetic track width of the first portion of the measured track width data, the magnetic width of the wider of the leading edge and the trailing edge equal to the average magnetic track width.

12. The method of claim 1, wherein determining at least one magnetic taper angle of the writing pole from the measured track width data comprises:

determining a first magnetic taper angle of the writing pole from a second portion of the measured track width data, the second portion comprises positive skew angles having magnitudes larger than the first magnetic taper angle; and determining a second magnetic taper angle of the writing pole from a third portion of the measured track width data, the third portion comprises negative skew angles having magnitudes larger than the second magnetic taper angle.

13. The method of claim 12, wherein the first magnetic taper angle is in a range between approximately 3 degrees and approximately 10 degrees.

14. The method of claim 12, wherein the second magnetic taper angle is in a range between approximately 3 degrees and approximately 10 degrees.

15. The method of claim 12, wherein the first magnetic taper angle is in a range between approximately 5 degrees and approximately 10 degrees.

16. The method of claim 12, wherein the second magnetic taper angle is in a range between approximately 5 degrees and approximately 10 degrees.

17. The method of claim 12, wherein the trailing edge is wider than the leading edge and determining the first magnetic taper angle comprises fitting the second portion of the measured track width data to a fitting function $$TW = W\cos\alpha_s + \left(\frac{H_1}{\cos\alpha_1}\right)\sin(\alpha_s - \alpha_1),$$

where TW is the measured track width of a track written at a skew angle $\alpha_s$, W is the magnetic width of the wider of the leading edge and the trailing edge, $H_1$ is a first magnetic length of the writing pole between the wider of the leading edge and the trailing edge and an intersection of the first side edge with the narrower of the leading edge and the trailing edge, the first magnetic length along a line generally perpendicular to the wider of the leading edge and the trailing edge, and $\alpha_1$ is the first magnetic taper angle.

18. The method of claim 17, further comprising determining the first magnetic length of the writing pole by calculating the first magnetic length from the fitting function.

19. The method of claim 18, wherein calculating the first magnetic length from the fitting function comprises calculating an average first magnetic length of the fitting function for the positive skew angles of the second portion.

20. The method of claim 12, wherein the trailing edge is wider than the leading edge and determining the first magnetic taper angle comprises fitting the second portion of the measured track width data to a linear function $TW=W+H_1(\alpha_s-\alpha_1)$, where TW is the measured track width of a track written at a skew angle $\alpha_s$, W is the magnetic width of the wider of the leading edge and the trailing edge, $H_1$ is a first magnetic length of the writing pole between the wider of the leading edge and the trailing edge and an intersection of the first side edge with the narrower of the leading edge and the trailing edge, the first magnetic length along a line generally perpendicular to the wider of the leading edge and the trailing edge, and $\alpha_1$ is the first magnetic taper angle.

21. The method of claim 12, wherein the trailing edge is wider than the leading edge and determining the second magnetic taper angle comprises fitting the third portion of the measured track width data to a fitting function:

$$TW = W\cos\alpha_s + \left(\frac{H_2}{\cos\alpha_2}\right)\sin(-\alpha_s - \alpha_2),$$

where TW is the measured track width of a track written at a skew angle $\alpha_s$, W is the magnetic width of the wider of the leading edge and the trailing edge, $H_2$ is a second magnetic length of the writing pole between the wider of the leading edge and the trailing edge and an intersection of the second side edge with the narrower of the leading edge and the trailing edge, the second magnetic length along a line generally perpendicular to the wider of the leading edge and the trailing edge, and $\alpha_2$ is the second magnetic taper angle.

22. The method of claim 21, further comprising determining the second magnetic length of the writing pole by calculating the second magnetic length from the fitting function.

23. The method of claim 22, wherein calculating the second magnetic length from the fitting function comprises calculating an average second magnetic length of the fitting function for the negative skew angles of the third portion.

24. The method of claim 12, wherein the trailing edge is wider than the leading edge and determining the second magnetic taper angle comprises fitting the third portion of the measured track width data to a linear function $TW=W+H_2(-\alpha_s-\alpha_2)$, where TW is the measured track width of a track written at a skew angle $\alpha_s$, W is the magnetic width of the wider of the leading edge and the trailing edge, $H_2$ is a second magnetic length of the writing pole between the wider of the leading edge and the trailing edge and an intersection of the second side edge with the narrower of the leading edge and the trailing edge, the second magnetic length along a line generally perpendicular to the wider of the leading edge and the trailing edge, and $\alpha_2$ is the second magnetic taper angle.

25. The method of claim 12, further comprising calculating a magnetic width of the narrower of the leading edge and the trailing edge of the writing pole and calculating an angle between the leading edge and the trailing edge.

26. A computer-readable medium having instructions stored thereon which cause a dynamic electrical testing system to perform a method for characterizing a portion of a writing pole of a perpendicular magnetic write head in proximity to a magnetic medium, the portion of the writing pole having a generally trapezoidal shape with a leading edge and a trailing edge, the method comprising:

providing measured track width data corresponding to magnetic track widths of a plurality of tracks written by the writing pole on a rotating magnetic medium underlying the writing pole, the magnetic track widths varying as a function of skew angle of the writing pole during writing;

determining a magnetic width of the wider of the leading edge and the trailing edge of the writing pole from a first portion of the measured track width data, the first portion corresponding to a first range of skew angles; and determining at least one magnetic taper angle of the write head from the measured track width data.

27. A system for characterizing a portion of a writing pole of a perpendicular magnetic write head in proximity to a magnetic medium, the portion of the writing pole having a generally trapezoidal shape with a leading edge and a trailing edge, the system comprising:

means for obtaining measured track width data corresponding to magnetic track widths of a plurality of tracks written by the writing pole on a rotating magnetic medium underlying the writing pole, the magnetic track widths varying as a function of skew angle of the writing pole during writing;

means for determining a magnetic width of the wider of the leading edge and the trailing edge of the writing pole from a first portion of the measured track width data, the first portion corresponding to a first range of skew angles; and means for determining at least one magnetic taper angle of the write head from the measured track width data.

* * * * *